Figure 1:
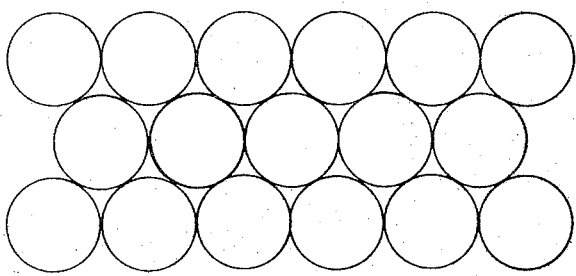

United States Patent [19]
Levitt

[11] 3,879,175
[45] Apr. 22, 1975

[54] BEARING BODIES AND METHODS OF FORMING BEARING SURFACES

[75] Inventor: Charlie Maurice Levitt, Johannesburg, South Africa

[73] Assignee: De Beers Industrial Diamond Division Limited, Johannesburg, South Africa

[22] Filed: Apr. 27, 1973

[21] Appl. No.: 355,200

Related U.S. Application Data
[62] Division of Ser. No. 156,427, June 24, 1971, abandoned.

[52] U.S. Cl. ............... 29/182.5; 75/200; 75/201; 75/203; 75/205
[51] Int. Cl. ............................................. B22f 1/00
[58] Field of Search ............ 75/205, 203, 201, 200; 51/309; 29/182.5; 252/12

[56] References Cited
UNITED STATES PATENTS

| 2,359,920 | 10/1944 | Keeleric | 51/309 |
| 2,411,867 | 12/1946 | Brenner | 51/309 |
| 2,904,418 | 9/1959 | Fahnoe | 51/309 |
| 3,295,941 | 1/1967 | Spellman | 51/309 |
| 3,316,073 | 4/1967 | Kelso | 51/309 |
| 3,579,390 | 5/1971 | Paine | 75/205 |
| 3,858,256 | 10/1958 | Fahnoe et al. | 51/309 |

Primary Examiner—Richard D. Lovering
Assistant Examiner—B. Hunt
Attorney, Agent, or Firm—Young & Thompson

[57] ABSTRACT

A hard wearing bearing surface is composed of rounded diamonds packed closely together and held by a metallic matrix. The tops of the diamonds have been removed down to a level close to or at the common equatorial planes of the diamonds. The diamonds can occupy a plane bearing surface or a rounded bearing surface.

10 Claims, 4 Drawing Figures

BEARING BODIES AND METHODS OF FORMING BEARING SURFACES

This is a division, of application Ser. No. 156,427, filed June 24, 1971, and now abandoned.

This invention relates to hard wearing bearing surfaces and a method of making them.

In some cases it is necessary to have hard wearing bearing surfaces composed of materials such as diamond, cubic boron nitride, or other hard abrasive material. In the case of diamond large crystals are available, but these crystals are expensive and in any case are not impact resistant since whichever way a crystal is cut, cleavage planes penetrate to the surface thus formed.

An object of the invention is to provide a novel type of hard wearing bearing surface which has no soft direction.

According to the invention a hard wearing bearing body is composed of a series of closely packed, originally round, hard abrasive particles with equatorial planes in a surface substantially parallel to the hard wearing surface, bonded together by a suitable matrix material and with the tops of the particles cut away to latitudes approaching the equatorial planes.

The matrix is preferably metallic and the particles are preferably diamonds and conveniently industrial diamond grit (natural or synthetic).

A method according to the invention consists in the steps of closely packing rounded hard abrasive particles with equatorial planes in a surface parallel to the desired hard wearing bearing surface, bonding the particles together so as to be held in the closely packed position, and removing all material down to a latitude on each particle approaching the equatorial plane and coincident with the desired bearing surface.

Note that the desired bearing surface may be planar or curved.

The particles may be held by bonding them together and perhaps to a substrate in a variety of ways. Thus they may be impregnated with a molten metal or resin which then solidifies between the particles or plating techniques may be used to bond the particles together. Furthermore the substrate may be shaped with depressions which register with the lower parts of the closely packed particles and the bonding applied to the substrate and around the particles.

Rounding of particles such as diamonds in a fluid-energy mill is, of course, well known so that there is no problem in procuring or providing the rounded particles.

Close packing may be achieved in one of two ways. One way is to make a compact with many layers of closely packed spheres and then abrade away one side of the compact until the particles have been suitably exposed. In the preferred way the particles are mounted on a surface in a single layer, bonded together and then abraded to expose the required surface.

To increase the surface area of abrasive exposed at the desired bearing surface, different sizes of particles may be used such that the larger particles touch one another, the next size occupies any voids that may be left, a still smaller size occupies the remaining voids and so on. However, as a practical matter two sizes will suffice to give a surface that tends to be occupied almost 100% by the abrasive. Use of a single size gives a 90.7% exposure of abrasive at the surface if material is removed up to the equatorial planes.

Figure 2:
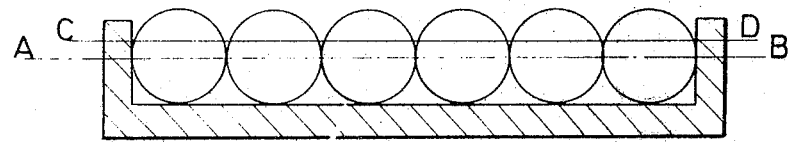
Figure 3:
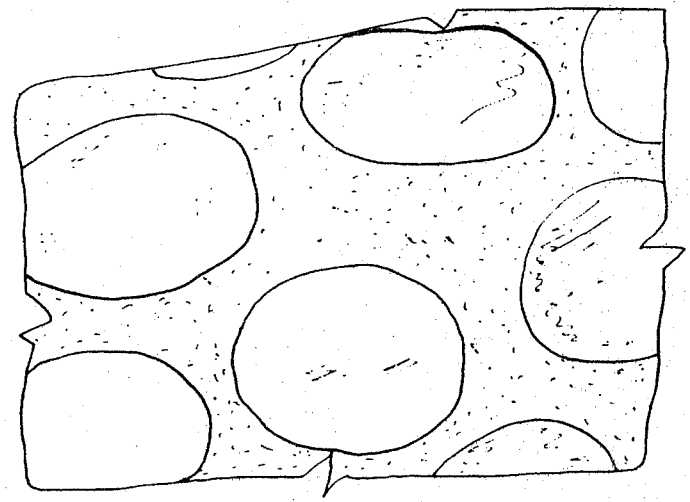
Figure 4:
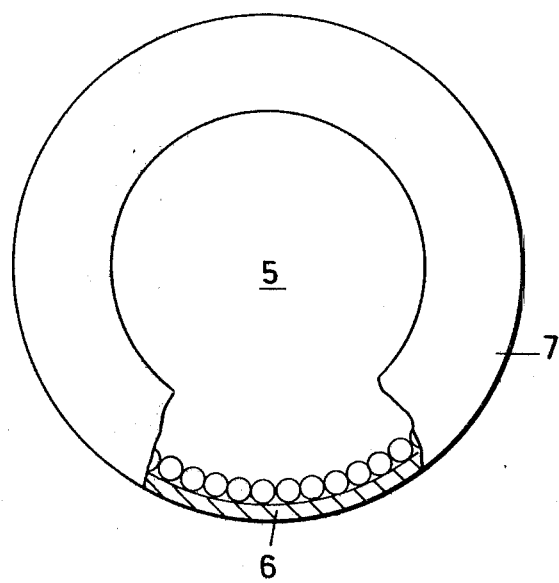

The invention is further discussed with reference to the accompanying drawings in which FIG. 1 is a plan view of a packing arrangement according to the invention on an enlarged scale, FIG. 2 is a section through a closely packed array also on an enlarged scale, FIG. 3 is a drawing of a photomicrograph of a hard wearing surface enlarged 50 times, and FIG. 4 is a view of apparatus for making cylindrically curved surfaces.

The first step in making a hard wearing bearing surface according to the invention is to secure rounded diamonds. These are obtainable in all grit sizes on a commercial scale. If they are not available grit may be rounded in a fluid energy mill e.g. of the type disclosed in U.S. Pat. No. 2,735,421. The grit size used is not critical, but the smaller the size the more difficult the particles are to handle. The inventor prefers to work with grit of 45/50 U.S. mesh because of the handling problem.

The next step is to secure close packing of the rounded particles. For making a flat wearing surface several procedures may be used. One is to pack the particles individually by hand. Obviously this is a laborious process. Another is to place particles in the base of a container and to shake the container until the particles are closely packed in a single layer. Any surplus particles may be scraped off or the particles can be bonded and the surplus removed later on.

An idealised form of close packing is illustrated in FIG. 1. Obviously in the practical case of rounded diamond grit the idealised condition is seldom achieved since the particles are seldom perfect spheres and seldom exactly of the same diameter.

After close packing the particles have to be bonded together and possibly also to a substrate. Of the variety of methods available two have been tried with success.

In one case a bronze consisting of 80 percent copper and 20 percent zinc was powdered. The powder was sifted on the closely packed array of particles in a container and the whole lightly shaken. When all the particles were covered a plunger was pressed on top of the assembly and the assembly was heated to melt the bronze. The container thus was a mould. The temperature was 750°C and a light pressure was used.

In another example the diamonds were shaken in a container with a conductive base and surplus diamonds were not removed. An electrolyte was then introduced. The base was turned into a cathode and an anode inserted above. Plating was commenced and after it was judged that the lower layer was firmly secured in place, surplus diamonds were removed.

The plating solution was nickel sulphate and nickel sulphamate. The solution also contained boric acid and a wetting and anti-pit agent. The temperature of the bath was kept between 60° and 70°C and the pH between 3.5 and 3.9. For the initial fixing of the bottom layer plating took place for 18 hours at 0.5 amp. The final plating was conducted for 160 hours at 2 amps.

In another case the conductive base was covered with a tacky adhesive, diamonds poured in and all those that did not adhere to the base were poured out again. Plating was conducted with the same solution at 2 amps until all the particles were covered.

It will be seen from FIG. 2 that in the idealised case the particles touch one another along a common plane A–B. Thus they have their equators in a common plane. The next step in the process is to remove all material above a desired plane. The desired plane may be the plane A–B but it is preferred that the desired plane be slightly higher, say, the plane C–D in FIG. 2. In the latter case an iceberg effect comes into play and the particles are encircled beyond their equators by the bonding medium and thus more securely held against dislodgement.

Removal of diamond above the plane C–D has been effected by means of a grinding operation followed by polishing on a scaife. This process works effectively and produces a well finished product. FIG. 3 is a drawing of a photomicrograph of diamonds of 45/50 grit size ground down and polished on a scaife.

If quicker results are desired the process disclosed in British Patent Specification 851 309 may be used for the removal of excess diamond. This is a fully disclosed procedure and needs no further discussion here. Note that there is no need to graphatise the diamonds as they are encased in a conductive matrix. Of course, a resin matrix may also be used, but then grinding and polishing are required to remove excess diamond.

In many applications hard wearing surfaces are journalled surfaces and they have to be cylindrical. These may be made by the apparatus shown in FIG. 4. In this case a disc 5 carried by a rotatable shaft (not shown) has a flange 6 which serves as a base and a cover ring 7. With the shaft running at a predetermined speed diamonds are introduced into the space between the ring 7 and the disc 5. It is preferred to coat the base 6 with adhesive before so doing. Then rotation can be stopped for bonding and other purposes. However, it is possible to spin the disc while particles are introduced and during the initial part of plating. Alternatively a liquid resin may be fed in during spinning and spinning is continued until the resin has set.

As shown in FIG. 4 ring-shaped single layers of closely packed diamonds are formed. Depending on whether the outer or inner periphery is to be the hard wearing surface, more or less difficulty is encountered in removing excess diamond. If the inner periphery is to be the hard wearing surface, the diamonds may be ground while on the flange 6. If the outer periphery is to be the wearing surface, the ring has to be stripped from the flange 6 and the ring mounted on a suitable shaft before grinding. It is believed that segmental wearing surfaces suitably spaced will probably be preferred because less diamonds will be consumed and also because the segments will be easier to handle. For making segmental wearing surfaces, dividers are fitted in the direction of the axis of the shaft in FIG. 4 on the base 6. Care has to be taken to introduce enough diamonds between each pair of dividers to ensure close packing.

In the case of surfaces made by the FIG. 4 configuration the teachings of British Specification No. 851 309 may also be applied with profit, if a metallic matrix is used.

We claim:

1. A hard-wearing bearing body composed of a series of closely packed, originally round, hard particles that touch each other at points defining equatorial planes substantially parallel to the bearing surface, the particles being bonded together by a solid matrix with the tops of the particles cut away to latitudes approaching said equatorial planes, the material of the particles being harder than the material of the matrix and the cut-away tops of the particles defining said bearing surface.

2. A bearing body as claimed in claim 1, the material of the particles being selected from the group consisting of diamond and boron nitride.

3. A bearing body as claimed in claim 1, the matrix being metal.

4. A bearing body as claimed in claim 3, in which said metal matrix extends on both sides of said equatorial planes.

5. A method of forming a hard-wearing bearing surface, comprising closely packing round hard particles in contact with each other at points defining equatorial planes parallel to the desired bearing surface, disposing a solid matrix about the particles thereby to bond the particles in the closely packed position, and removing all material down to a latitude on each particle approaching said equatorial plane and coincident with the desired bearing surface, the material of the particles being harder than the material of the matrix.

6. A method as claimed in claim 5, and temporarily holding the particles in closely packed relation by centrifugal force.

7. A method as claimed in claim 6, and effecting said bonding while the centrifugal force is still applied.

8. A method as claimed in claim 5, the material of the particles being selected from the group consisting of diamond and boron nitride.

9. A method as claimed in claim 5, the matrix being metal.

10. A bearing body as claimed in claim 1, said hard particles being disposed in a single layer.

* * * * *